United States Patent [19]

Pearson

[11] 4,050,338
[45] Sept. 27, 1977

[54] POWER KNIFE ADJUSTMENT FOR A SHEAR MACHINE

[75] Inventor: Eugene Walford Pearson, Orinda, Calif.

[73] Assignee: Canron, Inc.

[21] Appl. No.: 578,886

[22] Filed: May 19, 1975

[51] Int. Cl.² .............................................. B26D 5/12
[52] U.S. Cl. ..................................... 83/641; 74/110; 83/700
[58] Field of Search ................. 83/640, 698, 699, 700, 83/641; 74/110

[56] References Cited
U.S. PATENT DOCUMENTS 3,791,248  2/1974  Pearson .................................. 83/641

FOREIGN PATENT DOCUMENTS 900,847  7/1962  United Kingdom .................... 83/640

*Primary Examiner*—Othell M. Simpson
*Assistant Examiner*—W. D. Bray

[57] ABSTRACT

In a shear machine, the lower or fixed knife which is installed in a bed or table, which, in turn, is slidably supported on the front sloping edges of the machine housings, is adjustable horizontally with respect to the upper or movable knife by a power actuated wedge assembly installed frontally, in position to elevate the bed or table along the sloping edges, to reduce the horizontal spacing between the knives. Adjustable horizontal increase of the spacing between the knives is accomplished by adjustably lowering the bed or table along the sloping edges of the side wall housings, utilizing power in cooperation with the pull of gravity to accomplish this.

5 Claims, 8 Drawing Figures

POWER KNIFE ADJUSTMENT FOR A SHEAR MACHINE

The present invention relates to a mechanical shear or like machine, and more particularly to a knife adjustment for such machine, and is an improvement on the subject matter of my prior U.S. Pat. No. 3,791,248 of Feb. 12, 1974 for SHEAR MACHINE KNIFE ADJUSTMENT.

In cutting metal with a shear machine, horizontal clearance must exist between the cutting knives, the degree of clearance being usually determined by the thickness and character of metal to be cut. The knives, therefore, should be adjustable relative to each other, and in accordance with the present invention, the adjustment is applied to the lower knife.

Among the objects of the present invention are:

1. To provide a novel and improved knife adjustment for a shear machine or the like;
2. To provide a novel and improved knife adjustment for a shear or like machine, as applied to the lower or stationary knife of such machine;
3. To provide a novel and improved power actuated knife adjustment for a shear or like machine;
4. To provide a novel and improved power actuated knife adjustment for the lower or stationary knife of a shear or like machine, wherein adjustments in opposite directions horizontally may be accomplished through power operation;
5. To provide a novel and improved power actuated knife adjustment for a shear machine or the like, whereby both ends of a knife may be power adjusted simultaneously.

Additional objects of the invention will be brought out in the following description of the same, taken in conjunction with the accompanying drawings wherein.

Figure 1:
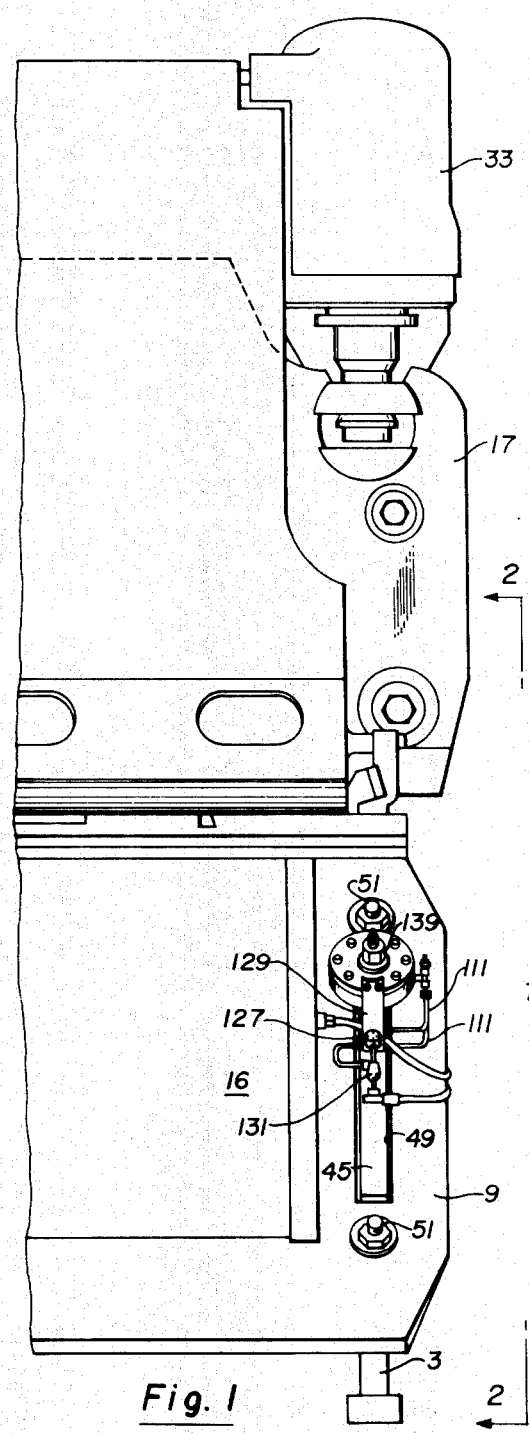
FIG. 1 is a front view in elevation of one end of a shear machine.
Figure 2:
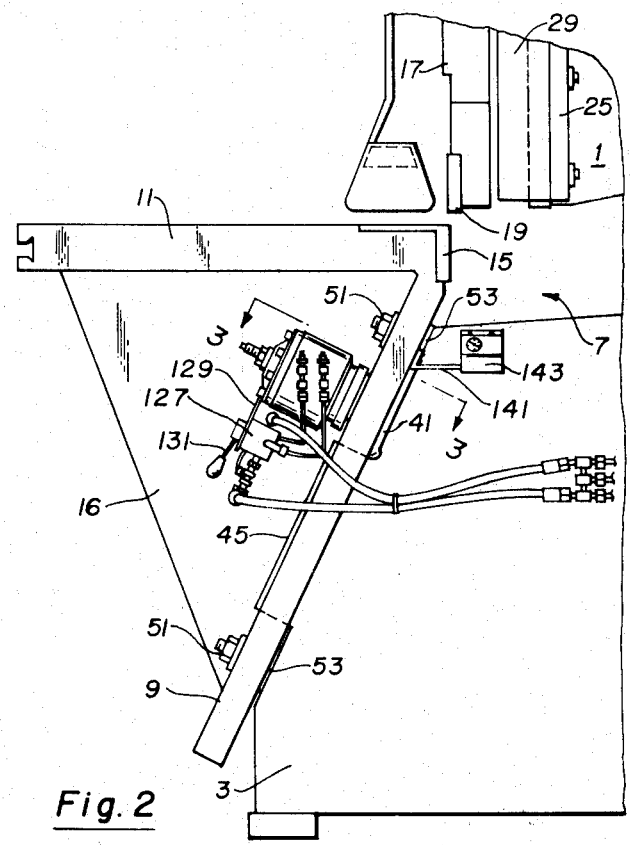
FIG. 2 is a fragmentary side view in elevation of the machine of FIG. 1.

Referring to the drawings for details of the invention, the same is shown incorporated into a hydraulically powered shear machine comprising a frame 1 involving a pair of spaced apart similar side housings 3, each formed with a relatively deep throat 7 in the front edge thereof.

Joining the side housings along the front edge below the throat, is a front wall 9 constituting a component of a work bed or table assembly in which the table 11 extends outwardly from the front wall along its upper edge.

The front wall and table, at the junction thereof, is recessed to receive a stationary knife 15 while the table itself is braced by end gussets 16.

The front edge portions of the side housings above the throats are set back somewhat to permit of supporting a ram 17 which carries the upper knife 19 of the machine in proper relationship to the fixed or stationary knife 15.

For the purpose of mounting the ram for movement, a pair of ways 25 are affixed to the upper front edges of the side housings, and the ram is slidably mounted on them by guide channels 29 affixed to the rear side of the ram and in the engagement with the ways.

The operating movements of the ram are controlled hydraulically in the machine under consideration by a system including a hydraulic motor 33 at each end, each fixed to the upper front edge of one of the side housings of the machine and coupled to the ram. Thus each end of the ram will be powered by one of these hydraulic motors.

The work to be sheared is held to the table by hold-down means involving a plurality of operated pistons in accordance with the disclosure of U.S. Pat. No. 2,781,844 of Feb. 19, 1957 for Hydraulically Powered Machine.

The side housings extend to the front of the machine and terminate in sloping front edges 41 making an angle of the order of 30° with the vertical. Each of such edges includes an upstanding lug 45.

The front wall 9 of the table assembly is adapted to span and slidably rest upon the sloping edges of the side housings, which may be deemed mounting walls, and to provide for such mounting, the front wall has end slots 49 to receive the lugs 45, the end slots being longer than the lugs to permit of limited sliding movement of the front wall on these sloping edges for adjustment purposes.

Mounting bolts 51 are provided at each corner of the front wall to securely hold a table assembly in any adjusted position. The hole for the mounting bolts in the front wall must accordingly be elongated to permit of any such adjustments. Preferably, a large washer 53 encircling each bolt 51 between the front wall and sloping edge of the mounting wall, will facilitate movement of the wall 9 with respect to the mounting walls in making adjustments and may be deemed a part of the sloping surface.

To enable such adjustments, the slots are enlarged circularly at their upper ends, at each of which ends is provided the power operated wedge assembly adjusting means of the present invention, which like that of the aforementioned earlier U.S. Pat. No. 3,719,248, extends in the frontal direction through the proximate slot of the front wall between and in contact with the upper edge of the slot and the upper end of associated abutment lug.

The wedge assembly portion of the adjustment means may include an upper wedge block 65 in engagement with the upper end of the slot 49 and making a complementary fit with the circular surface thereof at this point. The lower surface of this upper wedge block is inclined to provide an inclined wedge engageable surface extending in the frontal direction through its associated slot.

Supported on the upper end of the abutment lug 45 is a spherical seat component 69 to receive and support a complementary fitting lower wedge block 71 having a planar upper surface normal to the lug.

The upper and lower wedge blocks when in their respective positions, thus define a wedge space to receive a wedge 75.

The wedge has a longitudinal bore therethrough to freely receive a piston rod 79 which, at one end, is received into a recess 81 provided in the sloping edge of the mounting wall 3 and is securely fixed therein, while the opposite end portion 83 of the rod extends substantially beyond the exposed end of the wedge.

The piston rod is one element of a wedge drive assembly 84, the portion 83 being of such sufficient length to pass axially through and beyond a cylinder made up of a cup shaped component 87 slidably sealed to the piston rod by an O-ring 89, and a cap 91 bolted to the cup shaped component and slidably sealed to the shaft by an O-ring 93.

A piston 95 within the cylinder and slidably sealed to the inner wall thereof by an O-ring 97, is affixed to the rod.

To assure leak proof sealing between the piston and piston rod, the outer portion of the shaft from a point within the cylinder is slightly reduced in diameter to form a shoulder 99 to face an opposing shoulder on the piston, when the piston is installed about the rod. Between the two shoulders is an O-ring 101. To maintain sealing pressure by the opposing shoulders against such O-ring, a set screw 103 is angularly installed into the remote face of the piston to engage the rod.

Through the wall of the cylinder are provided two passageways 107, 109, one toward each end of the cylinder, each passageway being provided with a conventional fitting for coupling thereto, an hydraulic line 111, whereby the cylinder and its included piston and piston rod become the power drive means for the wedge assembly.

Admission of hydraulic fluid to one side or the other of the piston will cause the cylinder to slide in one direction or the other; in one direction, causing pressure to be applied to the wedge in the direction of driving the wedge into the wedge space, to angularly elevate the table assembly slightly, whereby the resulting forward adjustment of the stationary knife will slightly diminish the spacing between the two knives.

Insofar as described, the movement of the cylinder in the opposite or outward direction, will remove such pressure from the wedge and permit gravity, due to the weight of the table assembly, to cause withdrawal movement of the wedge and a corresponding increase in spacing between the knives.

However, due to improper servicing of the machine, increased frictional resistance due thereto, may render such outward adjustments of the wedge uncertain.

Accordingly, to overcome this problem and assure wedge movement in both directions despite resistive loading, the cylinder is mechanically coupled to the wedge. In the preferred embodiment, this is accomplished by forming the wedge to include exposed laterally extending ears 115, 117, each drilled to receive a bolt 118 for threaded engagement with the proximate end of the cylinder.

The loose fit of the wedge about the piston rod is to permit and assure a close complementary fit between the wedge and the upper wedge block, and, to assure that such complementary fit shall not be disturbed in the application of power to control movement of the wedge in either direction, due for example to any misalignment between the piston rod and wedge axis, a spherical washer assembly is interposed about the piston rod between the cylinder and the proximate end of the wedge, such spherical washer assembly including a spherical washer 119 and a complementary washer seat 121.

To further assure that the wedge shall have freedom to function, the bolt passageways through the lateral ears of the wedge should be slightly oversized and the cap screws should not be threaded in too tightly.

With a power drive means and wedge assembly thus installed at each end of the machine, hydraulic fluid under pressure of a pump 125 is supplied to each via a reversing valve assembly 127 of any appropriate type, in the present instance, supported on a bracket 129 mounted on the cap end of a proximate cylinder and controllable by a lever type handle 131.

Thus in one extreme position of the handle, hydraulic fluid will flow into the cylinder in a direction to drive the wedge forward, while in the opposite extreme position of the handle, the flow of hydraulic fluid into the cylinder will be in a direction to withdraw the wedge. Between such extreme positions of the valve assembly handle, is a cutoff position when no pressure flow of the hydraulic fluid occurs.

Figure 5:
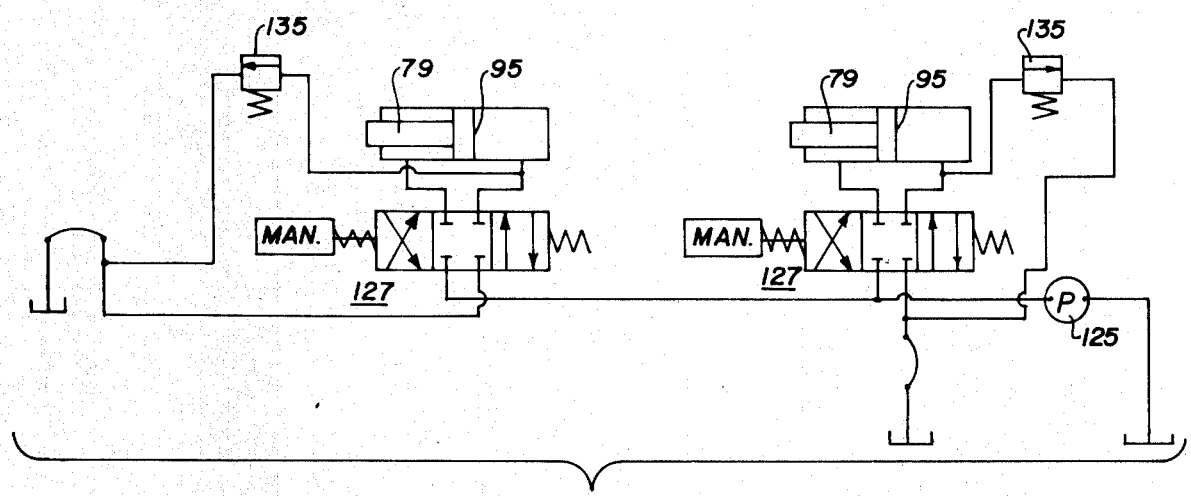
FIG. 5 is a view depicting hydraulic circuitry involving power control of the power drive unit at each end of the machine.

The hydraulic system involved is simple and by reference to FIG. 5, it will be noted that a pump supplies hydraulic fluid from a tank to both cylinders in parallel via the reversing valve associated with each cylinder, the fluid in the opposite end of each cylinder being returned to tank.

Inasmuch as the power drive means during withdrawal of the wedge will be aided by gravity, while in the reverse direction it will be opposed by gravity, greater pressures will be developed in the power drive means during operation in driving the wedge forward. As a safeguard against the development of excessive pressure during this portion of the operation of the power drive means, a safety valve 135 is connected in by-pass relationship to the power drive means, whereby, in the event of the development of such excessive pressure, the valve will open and by-pass the hydraulic fluid back to the tank.

By manipulation of the valve handle, the power drive means associated therewith, may be caused to move forward or in reverse, with an adjustable maximum limit in the reverse direction being provided by a nut 139 threadedly adjustable upon the exposed end of the piston rod. The nut at each end of the machine is adjusted independently of that at the other end, this being permitted by the minor clearances existing between the relatively movable parts, such as in the loose slidable fit of the table about the lugs 45 on the sloping edges of the side housings.

To enable determination of a prevailing adjustment as it is being made, a meter actuating finger 141 is affixed to the under side of the wall 9 at each end and directed parallel to the proximate side housing. As the table is adjusted along the sloping edges of the side housings, the free end of each finger moves accordingly and thus has a horizontal component of movement and a vertical component. Since the horizontal component is indicative of the horizontal adjustment being made of the lower knife, a meter 143 mounted on the proximate side housing, in the path of movement of the finger 141, will respond and indicate horizontal adjustments of the lower knife.

The power drive means at each end of the machine lend themselves to ganging as a step toward simplifying the procedure of adjusting and operating the wedge assemblies to perform such functions simultaneously.

Figure 6:
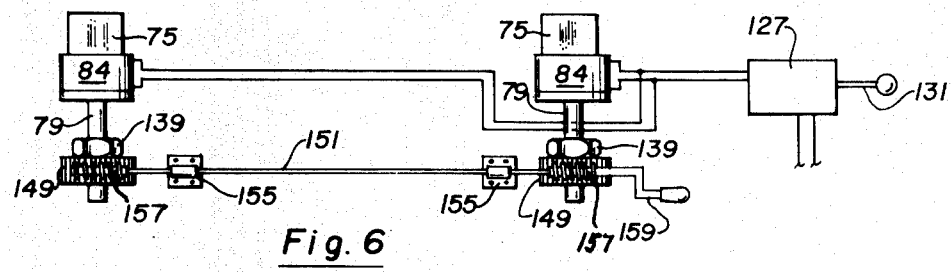
FIG. 6 is a view depicting a modification of the hydraulic circuitry of FIG. 5 to accomplish simultaneous adjustment of the lower knife from both ends, and also including means for simultaneously adjusting the stroke of both wedges simultaneously.
Figure 3:
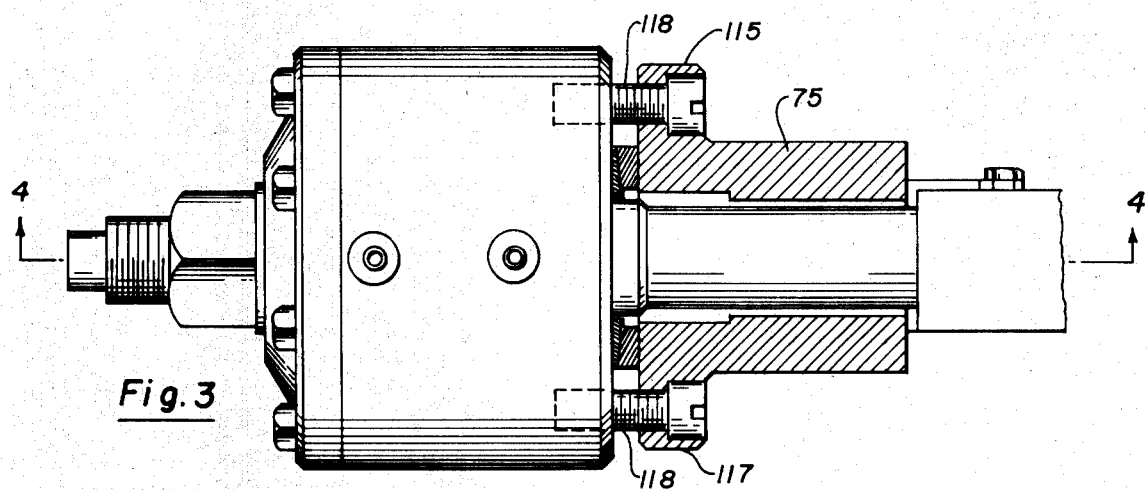
FIG. 3 is a plan view looking down on the power drive unit with associated wedge in section.
Figure 4:
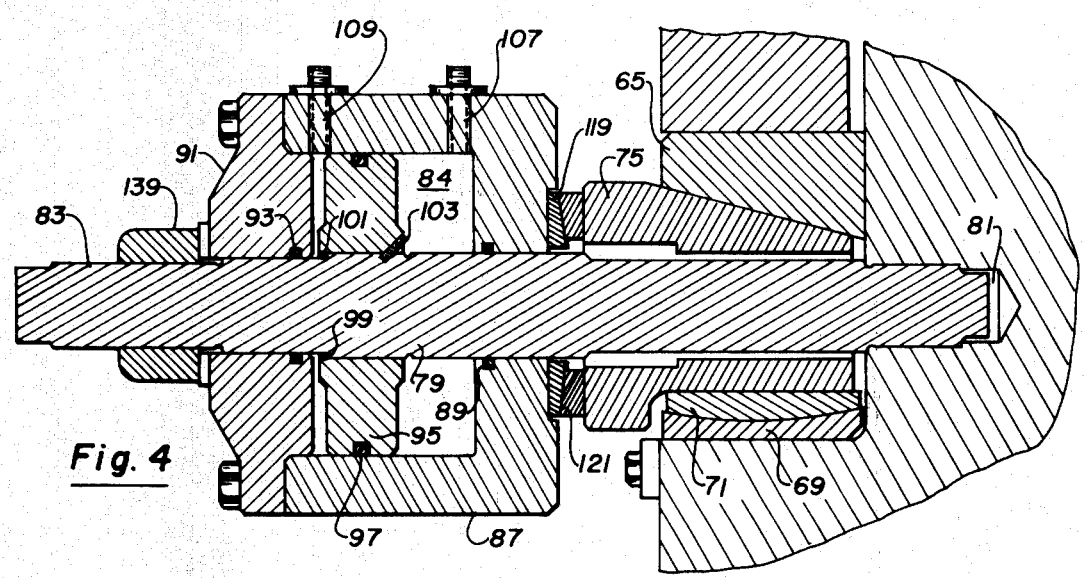
FIG. 4 is a view in section, enlarged, taken in the plane 3—3 of FIG. 2 and depicting details of a power drive unit, located at each end of the machine.

Referring to FIG. 6, one of the reversing valves is eliminated by supplying both hydraulically through one and the same reversing valve, this being accomplished by dividing the output from the one reversing valve into two branches, the one branch going to one of the power drive means and the second branch to the other.

In the same figure, return stroke limiting nuts 139 are ganged for simultaneous adjustment by associating with each nut, a worm gear 149 and coupling both gears by a cross shaft 151 mounted in spaced bearings 155 affixed to the front wall, the shaft carrying a worm 157 in mesh with each gear, and terminating in a crank 159 for manually rotating the shaft, whereby to adjust both nuts simultaneously.

Figure 7:
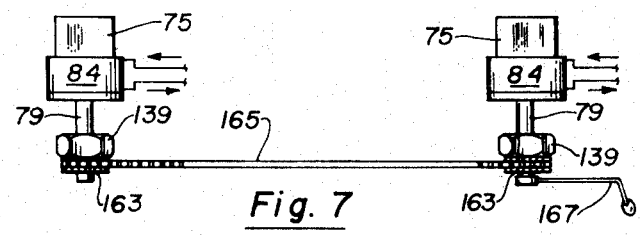
FIG. 7 is a view depicting a modification of the means of FIG. 6 for simultaneously adjusting the stroke of the wedges at both ends of the machine.
Figure 8:
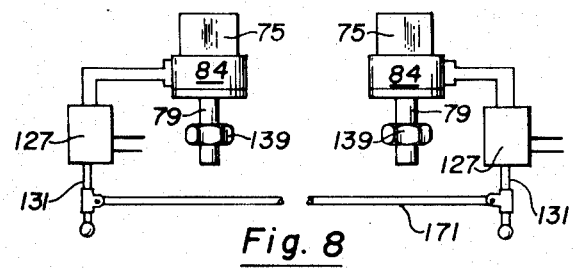
FIG. 8 is a pictorial illustration of the hydraulic system of FIG. 5, with a modification.

In FIG. 7, ganging of the nuts is accomplished by associating with each nut, a sprocket 163 and coupling the sprockets with a chain 165. A crank handle 167 affixed to one of said sprockets will enable adjustment of both nuts simultaneously.

Where a separate reversing valve is employed with each power drive means as in the system of FIG. 5, the operation can be simplified by ganging the reversing valves, and as illustrated in FIG. 8, this can be accomplished by connecting the valve handles 131 by a bar 171 pivotally secured at each end to one of the handles. Movement of one handle will result in a corresponding movement of the other, with like adjustments of both reversing valves.

It will be apparent from the foregoing that the invention fulfills all the objects set forth, and while I have illustrated and described the invention in its preferred form and in considerable detail, it will be apparent that the same is subject to alteration and modification without departing from the underlying principles involved, and I accordingly, do not desire to be limited in my protection to the specific details so illustrated and described, except as may be necessitated by the appended claims.

I claim:

1. A power operated wedge assembly comprising power drive means, a wedge assembly carried by said power drive means in a drive relationship therewith, and means for anchoring said power drive means to a fixed support on a machine for installing said power operated wedge assembly on said machine, said power drive means including a piston rod, a cylinder slidably mounted about said piston rod, a piston within said cylinder and fixedly secured to said piston rod, and a fluid passageway into said cylinder and terminating toward an end thereof.

2. A power operated wedge assembly in accordance with claim 1, characterized by said wedge assembly including a wedge encircling said rod and means coupling said wedge to said cylinder whereby said cylinder drives said wedge.

3. A power operated wedge assembly in accordance with claim 2, characterized by said wedge having a planar non-wedge surface to one side of said rod and a sloping wedge surface to the opposite side of said rod, a wedge block having at one side, a planar surface for engagement with the planar surface of said wedge and at its other side, a spherical seat complementing said spherical surface, and a wedge block having a sloping surface complementing the sloping surface of said wedge.

4. In a machine embodying a horizontal fixed element of substantial length, a movable element cooperating therewith to perform a change on a piece of work, a pair of mounting walls extending to the front of said machine and terminating in sloping front edges, each edge including an upstanding lug, a front wall carrying said fixed element, said front wall spanning said mounting walls and having end slots receiving said lugs, said end slots being longer than said lugs to permit of limited sliding movement of said front wall on the sloping edges of said mounting walls; a power operated wedge assembly at each end of said front wall and adjustably spacing the upper edge of each slot from the proximate lug to slidably adjust said front wall and fixed element carried thereby, along the proximate mounting wall whereby to alter the horizontal spacing between said fixed and movable elements, each said power operated wedge assembly extending in a frontal direction through one of said end slots, between the upper edge of said slot and the proximate lug and comprising power drive means including a piston rod, a cylinder slidably mounted about said piston rod, a piston within said cylinder and fixedly secured to said piston rod, a fluid passageway into said cylinder and terminating toward one end thereof, a second fluid passageway into said cylinder and terminating toward the other end thereof, whereby to provide for two-way hydraulic control of said power drive means; a wedge; means coupling said wedge to said cylinder; a pump; a hydraulic line to each of said fluid passages from said pump, and a reversing valve in said lines.

5. A machine in accordance with claim 4, characterized by said means for coupling said wedge to said cylinder including spaced ears on said wedge and facing said cylinder, said ears each having an opening therethrough, a pair of cap screws each passing through one of said openings and threadedly engaging said cylinder, said openings being oversized with respect to said cap screws, and a spherical washer assembly interposed between said wedge and said cylinder, said cap screws being loosely snugged whereby, with said spherical washer, minor misalignment between said cylinder and said wedge may be tolerated.

* * * * *